(12) United States Patent
Chen et al.

(10) Patent No.: US 10,404,143 B2
(45) Date of Patent: Sep. 3, 2019

(54) APPARATUS FOR DETECTING ANGULAR DISPLACEMENT, SYSTEM FOR CONTROLLING ROTATION ANGLE OF MOTOR, GIMBAL, AND AIRCRAFT

(71) Applicant: AUTEL ROBOTICS CO., LTD., Shenzhen, Guangdong (CN)

(72) Inventors: Fazhen Chen, Guangdong (CN); Yongqian Fan, Guangdong (CN); Zhengli Zhang, Guangdong (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/048,911

(22) Filed: Jul. 30, 2018

(65) Prior Publication Data

US 2018/0337579 A1 Nov. 22, 2018

Related U.S. Application Data

(63) Continuation-in-part of application No. PCT/CN2016/093608, filed on Aug. 5, 2016.

(30) Foreign Application Priority Data

Oct. 26, 2015 (CN) .................... 2015 2 0832857 U

(51) Int. Cl.
*H02K 11/215* (2016.01)
*G01B 7/30* (2006.01)
(Continued)

(52) U.S. Cl.
CPC .......... *H02K 11/215* (2016.01); *B64C 39/024* (2013.01); *B64D 47/08* (2013.01);
(Continued)

(58) Field of Classification Search
None
See application file for complete search history.

(56) References Cited

U.S. PATENT DOCUMENTS

| 6,373,247 B1 | 4/2002 | Marx et al. |
| 2011/0080162 A1* | 4/2011 | Steinich ............... G01B 7/30 |
| | | 324/207.25 |

(Continued)

FOREIGN PATENT DOCUMENTS

| CN | 101253389 A | 8/2008 |
| CN | 205066678 U | 3/2016 |

*Primary Examiner* — William B Perkey
(74) *Attorney, Agent, or Firm* — Ladas & Parry LLP

(57) ABSTRACT

The present invention relates to the field of motor detection, and in particular, to an apparatus for detecting an angular displacement, a system for controlling a rotation angle of a motor, a gimbal, and an aircraft. The apparatus for detecting the angular displacement provided the present invention includes a combined magnet, a Hall sensor, and a transmission component. The combined magnet includes a first magnet, a weak magnetic layer, and a second magnet that are sequentially stacked. Magnetic pole directions of the first magnet and the second magnet are opposite and parallel to the weak magnetic layer. The transmission component is connected to the combined magnet, and drives the combined magnet to rotate, or, the transmission component is connected to the Hall sensor, and drives the Hall sensor to rotate. the apparatus for detecting an angular displacement provided the present invention two magnets are combined together to form a combined magnet whose magnetic poles intersect each other to increase magnetic field strength at two poles of the magnet and reduce magnetic field diffusion, so that the apparatus for detecting an angular displacement provided the present invention can reduce interference to surrounding signals from magnetic field.

14 Claims, 4 Drawing Sheets

(51) Int. Cl.
- *H02K 11/30* (2016.01)
- *B64C 39/02* (2006.01)
- *B64D 47/08* (2006.01)
- *F16M 11/12* (2006.01)
- *F16M 11/20* (2006.01)
- *F16M 13/02* (2006.01)
- *G03B 15/00* (2006.01)
- *G03B 17/56* (2006.01)
- *F16M 11/18* (2006.01)
- *G01D 5/14* (2006.01)

(52) U.S. Cl.
CPC ......... *F16M 11/123* (2013.01); *F16M 11/125* (2013.01); *F16M 11/18* (2013.01); *F16M 11/2014* (2013.01); *F16M 11/2071* (2013.01); *F16M 13/02* (2013.01); *G01B 7/30* (2013.01); *G03B 15/006* (2013.01); *G03B 17/561* (2013.01); *H02K 11/30* (2016.01); *B64C 2201/127* (2013.01); *F16M 2200/041* (2013.01); *F16M 2200/044* (2013.01); *G01D 5/145* (2013.01)

(56) References Cited

U.S. PATENT DOCUMENTS

| | | |
|---|---|---|
| 2012/0038351 A1 | 2/2012 | Saruki et al. |
| 2012/0038359 A1 | 2/2012 | Saruki et al. |
| 2013/0241537 A1 | 9/2013 | Hammerschmidt et al. |
| 2013/0335070 A1* | 12/2013 | Abe .............. G01B 7/30 324/207.13 |
| 2015/0362335 A1* | 12/2015 | Spitzer .............. G01B 7/30 310/68 B |
| 2018/0010729 A1* | 1/2018 | Chen .............. F16M 11/18 |
| 2018/0262664 A1* | 9/2018 | Zhang .............. B64D 47/08 |

\* cited by examiner

APPARATUS FOR DETECTING ANGULAR DISPLACEMENT, SYSTEM FOR CONTROLLING ROTATION ANGLE OF MOTOR, GIMBAL, AND AIRCRAFT

CROSS REFERENCE

The present application is a continuation in part of International Application No. PCT/CN2016/093608, filed on Aug. 5, 2016, which claims priority of Chinese Patent Application No. 201520832857.X, filed on Oct. 26, 2015, both of which are hereby incorporated by reference in their entireties.

TECHNICAL FIELD

The present invention relates to the field of motor detection, and in particular, to an apparatus for detecting an angular displacement, a system for controlling a rotation angle of a motor, a gimbal, and an aircraft.

RELATED ART

In a conventional system for detecting an angular displacement of a motor, a Hall sensor is usually used to detect the change of magnetic poles of a single magnet. However, the single magnet has excessively scattered magnetic field lines. When the single magnet is applied to a device that needs to transmit other signals, the excessively scattered magnetic field lines interfere with the transmission of the other signals. For example, when a motor is applied to an unmanned aerial vehicle (UAV), the excessively scattered magnetic field lines in the system for detecting an angular displacement of a motor severely interfere with a radio signal of the UAV.

SUMMARY

The present invention aims to resolve the problem that excessively scattered magnetic field lines of a single magnet interfere with the transmission of other signals, and provides an apparatus for detecting an angular displacement, a system for controlling a rotation angle of a motor, a gimbal, and an aircraft.

To resolve the foregoing technical problem, the present invention provides the following technical solutions:

According to an aspect, the present invention provides an apparatus for detecting an angular displacement, including: a combined magnet, including a first magnet, a weak magnetic layer, and a second magnet that are sequentially stacked, and magnetic pole directions of the first magnet and the second magnet being opposite and parallel to the weak magnetic layer; a Hall sensor, used to detect an angular displacement of the combined magnet; and a transmission component, the transmission component being connected to the combined magnet, and driving the combined magnet to rotate, or, the transmission component being connected to the Hall sensor, and driving the Hall sensor to rotate.

In some embodiments, the first magnet and the second magnet have the same shape.

In some embodiments, each of the first magnet, the weak magnetic layer and the second magnet has a centrosymmetric shape.

In some embodiments, each of the first magnet, the weak magnetic layer and the second magnet has a disc shape.

In some embodiments, the first magnet, the weak magnetic layer, and the second magnet have the same disc size, and the first magnet and the second magnet have an equal disc thickness.

In some embodiments, at least one of the first magnet and the second magnet is manufactured by compressing magnetic powder and then performing magnetization.

In some embodiments, a protection layer made of a magnetically conductive material is disposed on an outer surface of the combined magnet.

According to a second aspect, the present invention provides a system for controlling a rotation angle of a motor, including a controller, a motor, and the foregoing apparatus for detecting the angular displacement, where the controller is respectively connected to the motor and the apparatus for detecting an angular displacement, controls an angular displacement of the motor, and receives a detection result of the apparatus for detecting the angular displacement; and the motor is further connected to the apparatus for detecting the angular displacement through the transmission component, and detects the angular displacement by using the apparatus for detecting the angular displacement.

According to a third aspect, the present invention provides a gimbal, including a plurality of motors and the foregoing system for controlling the rotation angle of a motor, where the system for controlling the rotation angle of the motor is respectively connected to the plurality of motors, and respectively controls the plurality of motors to rotate.

According to a fourth aspect, the present invention provides an aircraft, including a photographing apparatus, a main body, and the foregoing gimbal, where the photographing apparatus is mounted on the gimbal, and the gimbal is connected to the main body.

The beneficial effects of the present invention lie in that in the apparatus for detecting the angular displacement provided by the present invention, two magnets are combined together to form a combined magnet whose magnetic poles intersect each other to increase magnetic field strength at two poles of the magnet and reduce magnetic field diffusion, so that the apparatus for detecting the angular displacement provided by the present invention can reduce interference to surrounding signals from magnetic field.

Figure 1:
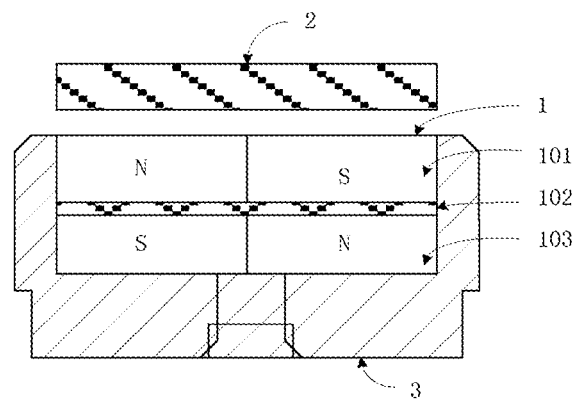
FIG. 1 is a schematic structural diagram of an apparatus for detecting an angular displacement according to an embodiment of the present invention.

Reference numerals: 1, combined magnet; 101, first magnet; 102, weak magnetic layer; 103, second magnet; 2, Hall sensor; 3, transmission component; 4, apparatus for detecting an angular displacement; 5, controller; and 6, motor.

DETAILED DESCRIPTION

To make the objectives, technical solutions, and advantages of the present invention more comprehensible, the present invention is further described in detail below with reference to the accompanying drawings and embodiments. It should be understood that specific embodiments described herein are merely used to explain the present invention instead of limiting the present invention.

Referring to FIG. 1, FIG. 1 is a schematic structural diagram of an apparatus for detecting an angular displacement according to an embodiment of the present invention.

As shown in FIG. 1, the apparatus for detecting the angular displacement includes a combined magnet 1, a Hall sensor 2, and a transmission component 3.

The combined magnet 1 includes a first magnet 101, a weak magnetic layer 102, and a second magnet 103 that are sequentially stacked. Magnetic pole directions of the first magnet 101 and the second magnet 103 are opposite and parallel to the weak magnetic layer 102. The Hall sensor 2 is used to detect an angular displacement of the combined magnet 1. The transmission component 3 is connected to the combined magnet 1, and drives the combined magnet 1 to rotate, or the transmission component 3 is connected to the Hall sensor 2, and drives the Hall sensor 2 to rotate.

The weak magnetic layer 102 is configured to block magnetic field lines on adjacent surfaces of the first magnet 101 and the second magnet 103.

Optionally, the first magnet 101 and the second magnet 103 have the same shapes, to achieve the fastest convergence of magnetic field.

Optionally, each of the first magnet 101, the weak magnetic layer 102 and the second magnet 103 has a centrosymmetric shape, so that the combined magnet has regularly distributed magnetic field, making it convenient for a Hall sensor to detect the angular displacement of the combined magnet.

Figure 2:
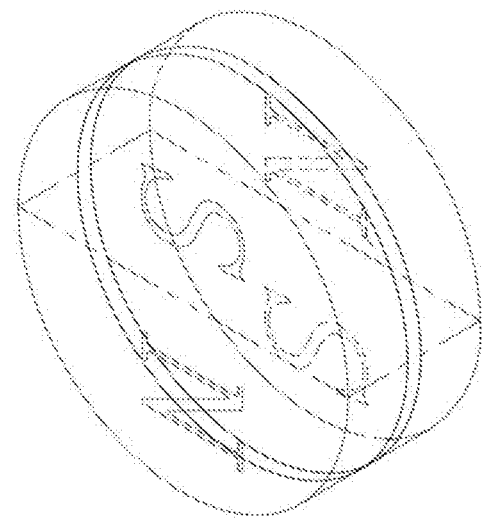
FIG. 2 is a schematic structural diagram of a combined magnet in the apparatus for detecting the angular displacement according to an embodiment of the present invention.

FIG. 2 is a schematic structural diagram of the combined magnet 1. In this embodiment, each of the first magnet 101, the weak magnetic layer 102 and the second magnet 103 has a disc shape. A person skilled in the art should understand that the first magnet 101, the weak magnetic layer 102, and the second magnet 103 may be set to have a strip shape or other shapes. The shape setting in this embodiment is not used to limit the present invention.

Optionally, the first magnet 101, the weak magnetic layer 102, and the second magnet 103 have the same disc size, and the first magnet 101 and the second magnet 103 have an equal disc thickness. By using such a setting, the combined magnet has regularly distributed magnetic field, so as to achieve the fastest convergence of magnetic field.

Optionally, at least one of the first magnet 101 and the second magnet 103 is manufactured by compressing magnetic powder and then performing magnetization, so as to obtain the combined magnet 1. Specifically, the first magnet 101 and the second magnet 103 are formed by compressing magnetic powder in the same mold having the weak magnetic layer 102, and the first magnet 101 and the second magnet 103 are then magnetized. For the combined magnet 1 manufactured in such an integral forming manner, magnetization may be performed on the first magnet 101 and the second magnet 103 according to a requirement, to achieve high adjustability. Moreover, the integrally formed combined magnet 1 is firmer and cannot be easily damaged.

Optionally, a protection layer is disposed on an outer surface of the combined magnet 1. The protection layer may be made of a magnetically conductive material, and may be specifically a white zinc layer. The protection layer is used to prevent the combined magnet from being accidentally scraped and protect the magnetism of the combined magnet 1.

Figure 3:
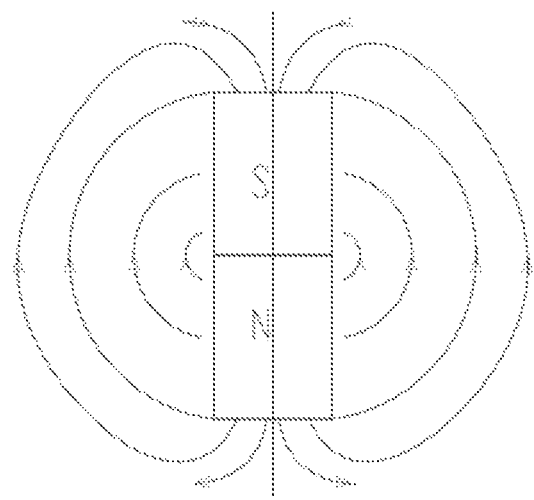
FIG. 3 is a magnetic field distribution diagram of a single magnet.
Figure 4:
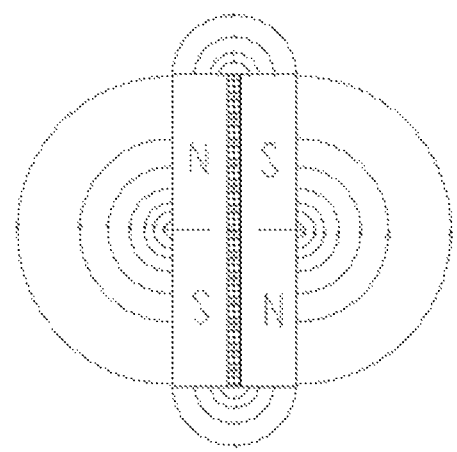
FIG. 4 is a magnetic field distribution diagram of the combined magnet according to an embodiment of the present invention.

The combined magnet provided in the present invention can increase magnetic field strength at two poles of the magnet and reduce magnetic field diffusion. Specific principles are as follows:

Referring to FIG. 3 and FIG. 4, FIG. 3 is a magnetic field distribution diagram of a single magnet, and FIG. 4 is a magnetic field distribution diagram of the combined magnet provided in the present invention. The density of magnetic field lines represents the magnitude of magnetic field strength. The density of magnetic field lines of the combined magnet is higher than the density of magnetic field lines of the single magnet. Therefore, the magnetic field strength of the combined magnet is higher than the magnetic field strength of the single magnet. Magnetic field lines of a magnet follow the principle of nearby magnetic field or strong magnetic field. Magnetic field lines from the N pole of the magnet converge at an adjacent S pole. Two adjacent S poles are provided near the N poles of the first magnet and the second magnet of the combined magnet, so that the magnetic field diffusion is less than that at the single S pole of a single magnet.

Figure 5:
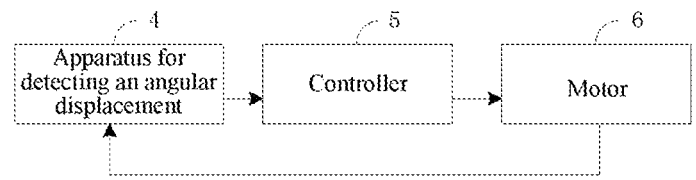
FIG. 5 is a schematic architecture diagram of a system for controlling a rotation angle of a motor according to another embodiment of the present invention.

Referring to FIG. 5, FIG. 5 is a schematic architecture diagram of a system for controlling a rotation angle of a motor according to another embodiment of the present invention.

As shown in FIG. 5, the system for controlling a rotation angle of a motor includes a controller 5, a motor 6, and an apparatus 4 for detecting the angular displacement provided in the present invention. The controller 5 is respectively connected to the motor 6 and the apparatus 4 for detecting an angular displacement, and configured to control an angular displacement of the motor 6, and receive a detection result of the apparatus 4 for detecting the angular displacement.

The motor 6 is further connected to the apparatus 4 for detecting an angular displacement through the transmission component 3, and detects the angular displacement by using the apparatus 4 for detecting the angular displacement of the motor 6.

The apparatus for detecting an angular displacement provided the present invention is used in the system for controlling the rotation angle of the motor provided in the present invention to increase magnetic field strength at two poles of the magnet and reduce magnetic field diffusion, so that interference to surrounding signals from magnetic field is reduced.

Figure 6:
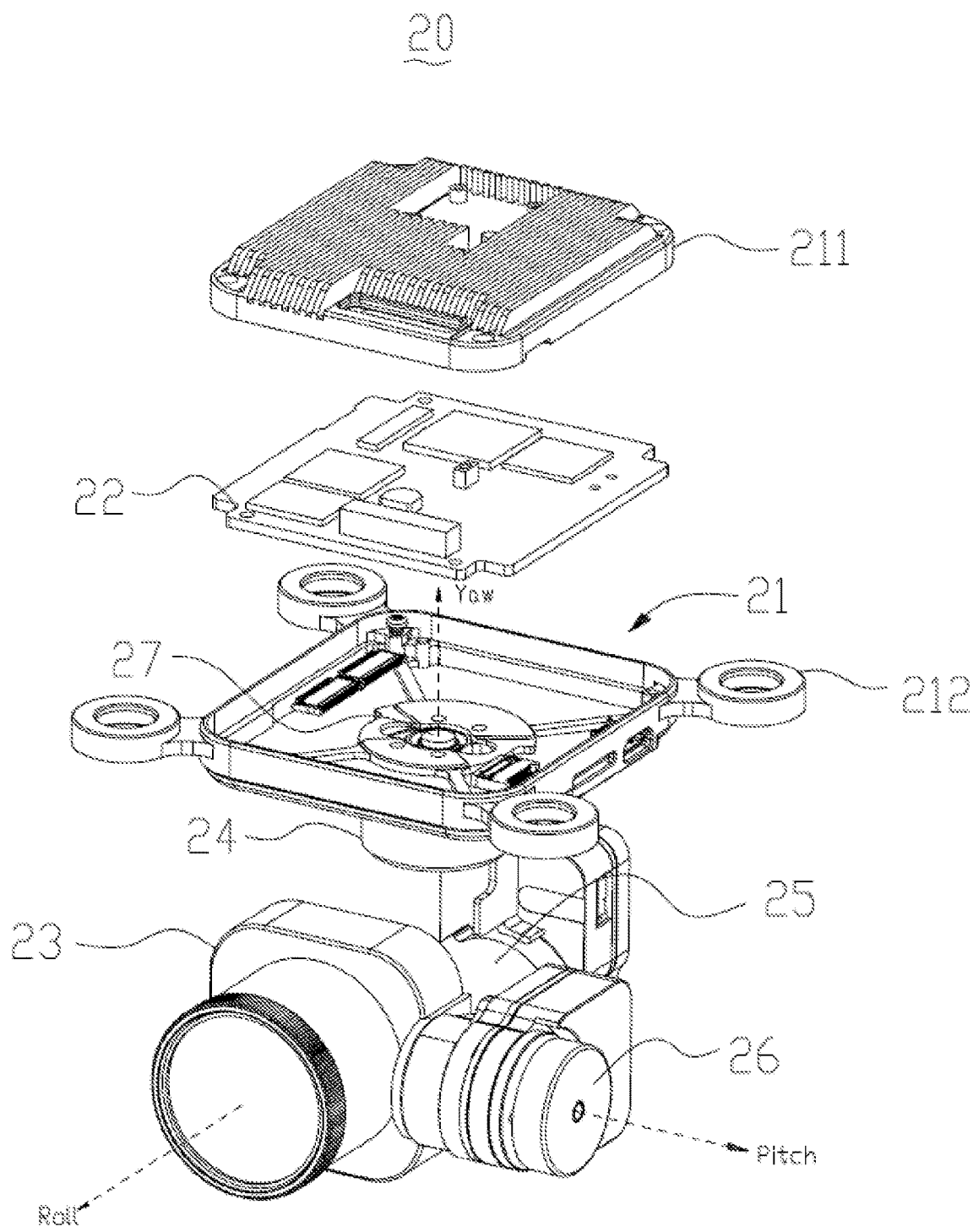
FIG. 6 is a schematic structural diagram of a gimbal according to an embodiment of the present invention.

Referring to FIG. 6, a gimbal 20 includes a frame 21, a motor 24 coupled to the frame 21, a photographing apparatus 23 coupled to the motor 24, an apparatus (unlabeled) for detecting an angular displacement of the motor 24 and a controller 22 for controlling the angular displacement of the motor 24 according to a detection result of the apparatus.

In this embodiment, the gimbal 20 is a three-axis gimbal. The motor 24 is used to drive the photographing apparatus 23 to rotate about Yaw axis. Besides, the gimbal 20 further includes a motor 25 used to drive the photographing apparatus 23 to rotate about Roll axis and a motor 26 used to drive the photographing apparatus 23 to rotate about Pitch axis.

The frame 21 is used to connect the whole gimbal 20 with a main body of an aircraft. In one embodiment of the present invention, the frame 21 includes a first frame 211 and a second frame 212. The first frame 211 and the second frame 212 form a receiving room for receiving the controller 22. The controller 22 is capable of controlling angular displacements of all these motors.

The apparatus for detecting the angular displacement of the motor 24 includes a combined magnet 27 and a Hall sensor electrically connected to the controller 22. The motor 24 has a rotator and a stator. The stator is disposed in the receiving room and fixed with the second frame 212. The rotator includes a rotating shaft and the combined magnet 27 is disposed on an end of the rotating shaft. When the rotating shaft rotates, the combined magnet 27 rotates together with the rotating shaft. The Hall sensor is disposed on a surface of the controller 22 and the surface of the controller 22 faces the second frame 212. The Hall sensor are disposed opposite to the combined magnet 27.

The structure and functions of the combined magnet 27 are the same with the combined magnet 1 described in above embodiment. Therefore, details are not described here again.

In another embodiment of the present invention, the motor 25 and motor 26 also can be configured with an apparatus for detecting the angular displacement respectively. The structure of the apparatus can be the same with the apparatus described above or be not the same with the apparatus described above.

Figure 7:
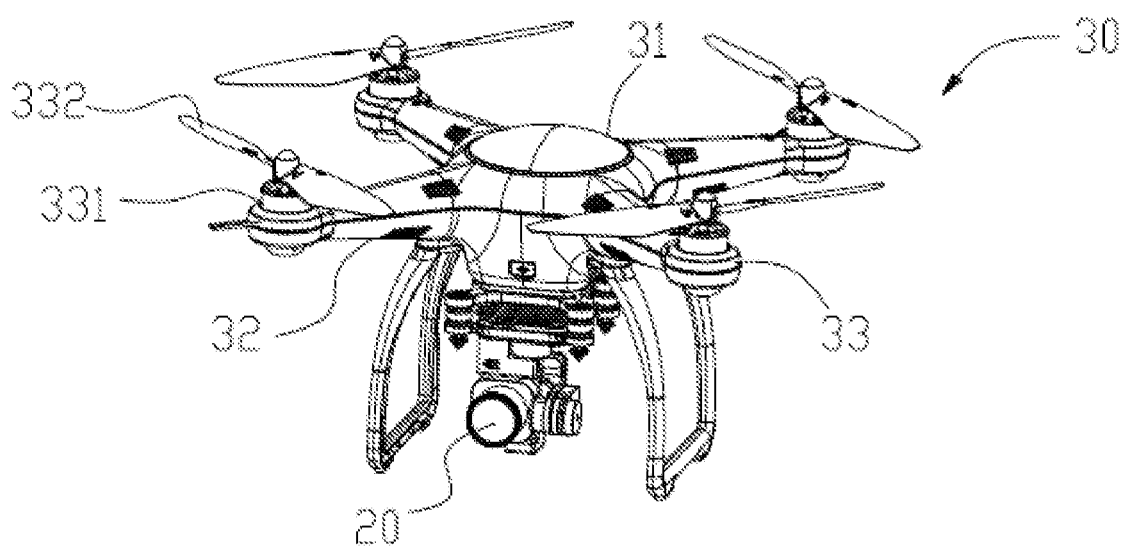
FIG. 7 is a schematic structural diagram of an aircraft according to an embodiment of the present invention.

Referring to FIG. 7, an aircraft 30 includes a main body 31, four arms 32 extending from the main body 31, an actuating apparatus 33 disposed on one end of the arm 32 and a gimbal 20 provided in the above mentioned embodiments. The gimbal 20 is connected to the main body 31. The actuating apparatus 33 includes a motor 331 and a propeller 332 connected to a shaft of the motor 331. The propeller 332 is driven by the motor 331 so that generating a lifting force to drive the aircraft 30 to fly.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:

1. A gimbal, comprising:
a frame;
a motor coupled to the frame;
a photographing apparatus coupled to the motor, the photographing apparatus being driven to rotate about an axis by the motor;
an apparatus for detecting an angular displacement of the motor; and
a controller, the controller controlling the angular displacement of the motor according to a detection result of the apparatus; wherein
the apparatus comprising:
a combined magnet, coupled to a rotator of the motor and comprising a first magnet, a weak magnetic layer and a second magnet that are sequentially stacked, magnetic pole directions of the first magnet and the second magnet being opposite and parallel to the weak magnetic layer; and
a Hall sensor, used to detect the angular displacement of the combined magnet, the hall sensor being disposed opposite to the combined magnet and electrically connected to the controller.

2. The gimbal according to claim 1, wherein the first magnet and the second magnet have the same shape.

3. The gimbal according to claim 2, wherein each of the first magnet, the weak magnetic layer and the second magnet has a centrosymmetric shape.

4. The gimbal according to claim 3, wherein each of the first magnet, the weak magnetic layer and the second magnet has a disc shape.

5. The gimbal according to claim 4, wherein the first magnet, the weak magnetic layer and the second magnet have the same disc size, and the first magnet and the second magnet have an equal disc thickness.

6. The gimbal according to claim 1, wherein at least one of the first magnet and the second magnet is manufactured by compressing magnetic powder and then performing magnetization.

7. The gimbal according to claim 1, wherein a protection layer made of a magnetically conductive material is disposed on an outer surface of the combined magnet.

8. An aircraft, comprising:
a main body;
an arm coupled to the main body;
an actuator apparatus disposed on the main body; and
a gimbal connected to the main body; wherein
the gimbal comprises:
a frame;
a motor coupled to the frame;
a photographing apparatus coupled to the motor, the photographing apparatus being driven to rotate about an axis by the motor;
an apparatus for detecting an angular displacement of the motor; and
a controller, the controller controlling the angular displacement of the motor according to a detection result of the apparatus; wherein
the apparatus comprising:
a combined magnet, coupled to a rotator of the motor and comprising a first magnet, a weak magnetic layer and a second magnet that are sequentially stacked, magnetic pole directions of the first magnet and the second magnet being opposite and parallel to the weak magnetic layer; and
a Hall sensor, used to detect the angular displacement of the combined magnet, the hall sensor being disposed opposite to the combined magnet and electrically connected to the controller.

9. The aircraft according to claim 8, wherein the first magnet and the second magnet have the same shape.

10. The aircraft according to claim 9, wherein each of the first magnet, the weak magnetic layer and the second magnet has a centrosymmetric shape.

11. The aircraft according to claim 10, wherein each of the first magnet, the weak magnetic layer and the second magnet has a disc shape.

12. The aircraft according to claim 11, wherein the first magnet, the weak magnetic layer and the second magnet have the same disc size, and the first magnet and the second magnet have an equal disc thickness.

13. The aircraft according to claim 8, wherein at least one of the first magnet and the second magnet is manufactured by compressing magnetic powder and then performing magnetization.

14. The gimbal according to claim 8, wherein a protection layer made of a magnetically conductive material is disposed on an outer surface of the combined magnet.

* * * * *